Nov. 7, 1961 N. H. CHERRY 3,008,049
TESTING APPARATUS

Filed May 13, 1957 4 Sheets-Sheet 2

INVENTOR.
NORMAN H. CHERRY
BY
ATTORNEYS

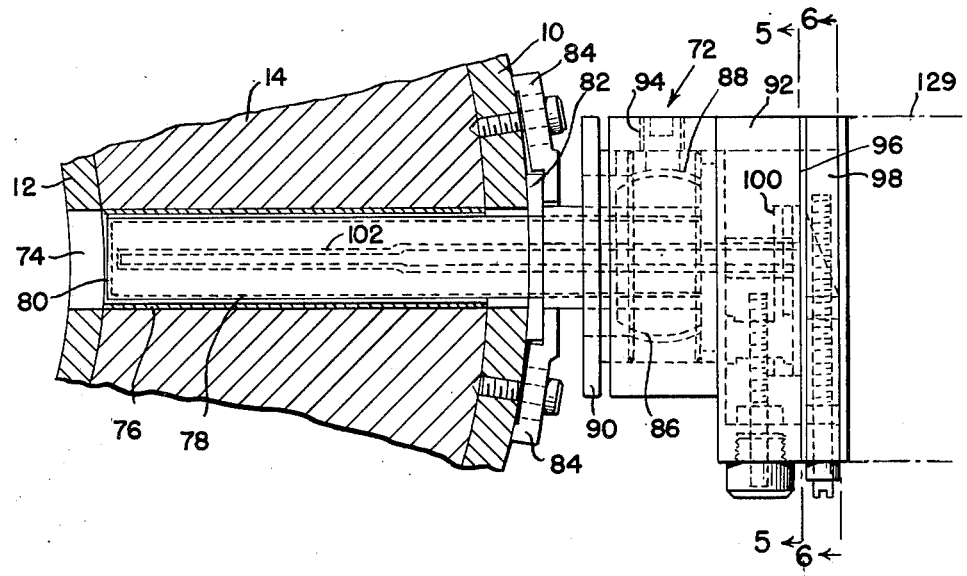
FIG. 4.
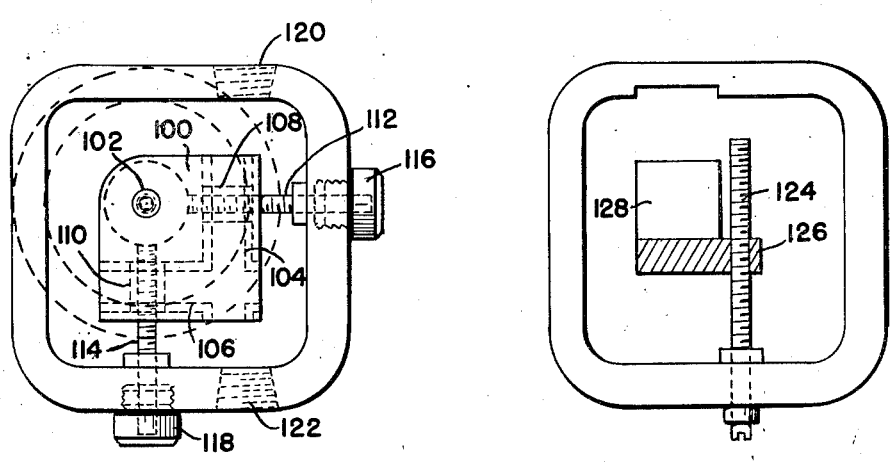
FIG. 5.
FIG. 6.
*INVENTOR.*
NORMAN H. CHERRY
BY
ATTORNEYS United States Patent Office 3,008,049
Patented Nov. 7, 1961

3,008,049
TESTING APPARATUS
Norman H. Cherry, Philadelphia, Pa., assignor to Nuclear Research Corporation, Southampton, Pa., a corporation of Pennsylvania
Filed May 13, 1957, Ser. No. 658,593
10 Claims. (Cl. 250—83.3)

This invention relates to testing apparatus of the nondestructive type utilizing gamma rays. In particular, it is designed for the detection of flaws in metallic objects.

The apparatus constituting the present invention is of the general type described in my application, Serial No. 390,486, filed November 6, 1953.

One of the objects of the present invention is the provision of an apparatus for the testing of relatively heavy objects such as artillery shells. In accordance with the invention means are provided to facilitate the rapid and convenient handling of such objects. In brief, in accordance with the invention, objects such as shells may be located on a carrier out of the region of gamma rays and are located in position for exposure to the gamma rays for testing. The objects are slowly moved so as to undergo scanning for the detection of flaws.

A further object of the invention relates to provisions for the safe handling of the source or sources of the gamma rays.

Other objects of the present invention relate to the provision of improved collimating means capable of limiting the field of scanning so as to detect and localize flaws of very small dimensions.

The foregoing and other objects of the invention particularly relating to details of construction and operation will become apparent from the following description, read in conjunction with the accompanying drawings, in which:

FIGURE 4 is a horizontal sectional view showing details of a preferred collimating means;

FIGURE 5 is a section taken on the plane indicated at 5—5 in FIGURE 4; and

FIGURE 6 is a section taken on the plane indicated at 6—6 in FIGURE 4.

Figure 1:
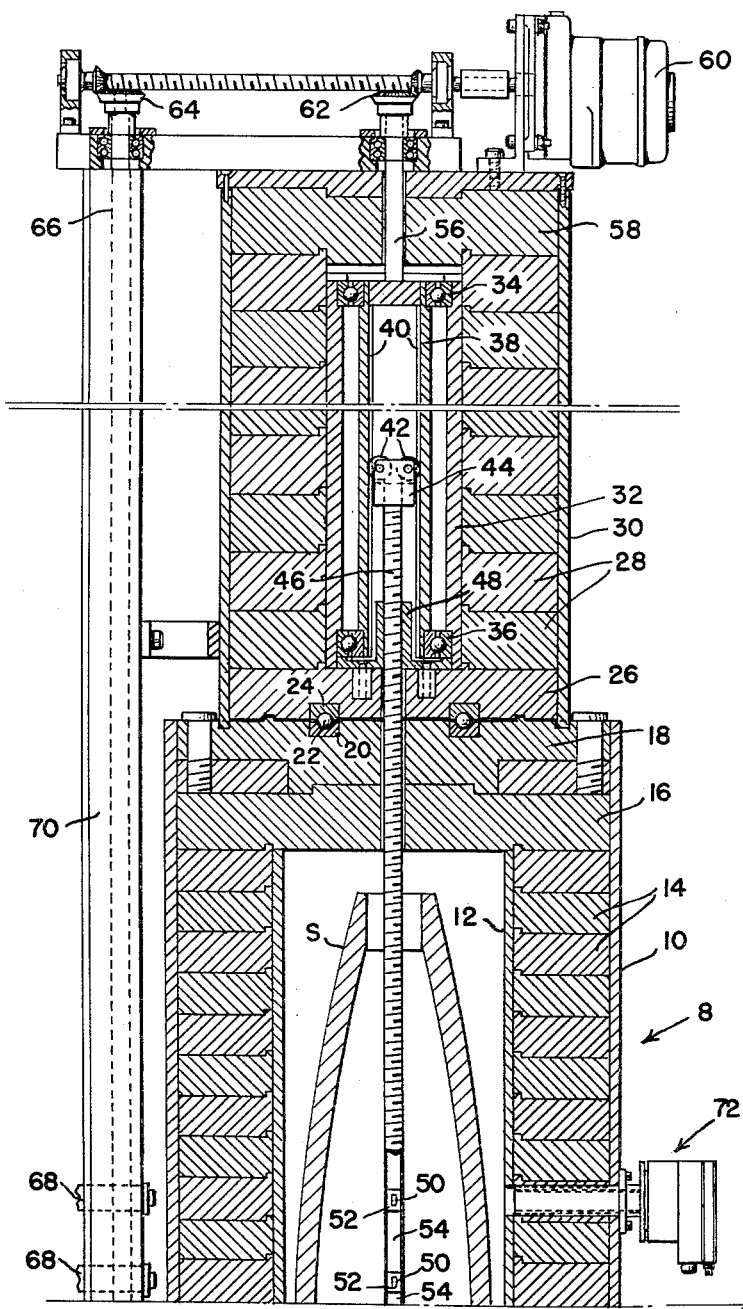
FIGURE 1 is a sectional view of the upper portion of the apparatus showing particularly the scanning region and the storage housing for the source of gamma rays.
Figure 2:
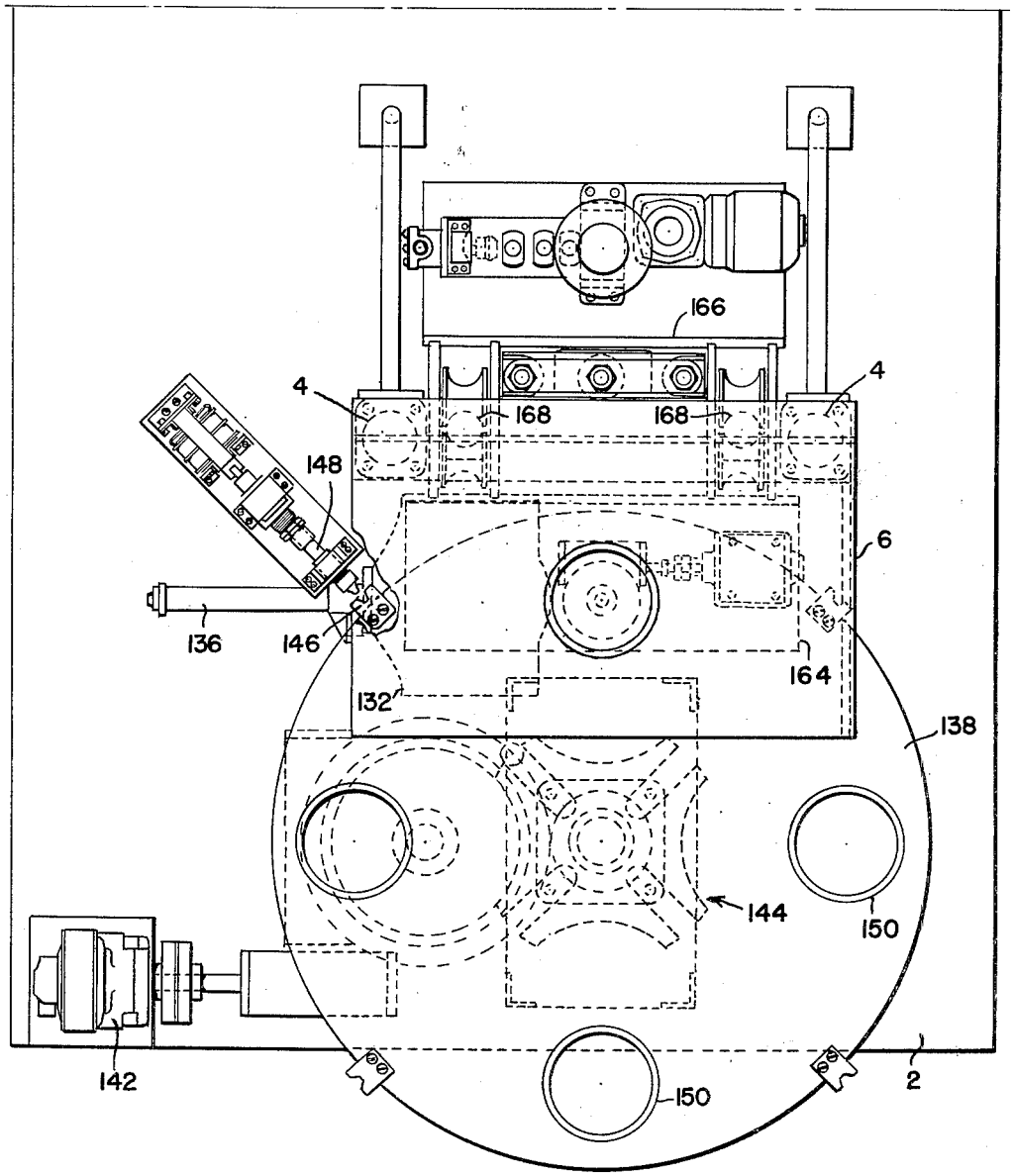
FIGURE 2 is a fragmentary plan view of the apparatus showing, in particular, the object handling devices.

The device shown in the drawings comprises a frame 2 which includes the base and upright columns 4 which support a platform 6 on which there is mounted a housing 8 within which the object to be examined, such as a shell S, is located in association with one or more sources of gamma rays. The housing 8 comprises outer and inner steel cylinders 10 and 12, concentrically arranged, with the space between them filled by lead rings 14 which are suitably interlocked to prevent escape of radiation. The platform 6 is provided with an opening aligned with the opening in the cylinder 12, and surmounting the housing is a lead cap member 16 provided with a central opening through which the radioactive source is projected. A further lead cap 18 mounts the lower race 20 of a bearing arrangement comprising additionally the balls 22 and upper race 24 which latter is mounted in a lower element 26, also of lead, forming part of a storage container surrounded by a steel cylinder 30 and containing between this cylinder and an interior steel cylinder 32 lead rings 28. The storage housing assembly is mounted by the ball bearing arrangement eccentrically through the cap member 16, with the result that, by rotation, an opening in the member 26 may be either aligned with, or misaligned with respect to, the opening in the member 16. This arrangement is generally similar to that described in the application referred to above, and provides for storage in a closed region of the radioactive source material when it is not in use. Upper and lower bearings 34 and 36 in the tube 32 serve to mount a rotating tube 38 which is provided with longitudinally extending tracks 40 engaging rollers 42 of a carriage 44 which supports a screw-threaded tube 46 passing through a fixed nut 48. The tube 46 contains the radioactive source or sources 50 individually located in small containers 52 and located in properly spaced positions by rods 54. The tube 46 is desirably formed of aluminum.

Rotation is imparted to the tube 38 through a shaft 56 which is rotated by a motor 60 through bevel gearing 62, the motor being mounted above the top cap 58 of the storage housing. Also driven by the motor 60 through bevel gearing 64 is a vertically arranged screw 66 having threads of the same pitch as those on the tube 46, the screw 66 being arranged to traverse vertically slides 68 along a track 70 secured to the storage housing. These slides are provided with pins which may be projected between the adjacent thread convolutions of the screw 66 for the purpose of giving approximate indication of the positions of the radioactive sources 50.

The housing 8 is provided with a desirable number of windows provided by openings 74 through the housing, the openings through the lead rings 14 being desirably lined by means of steel tube 76. Associated with each of these windows, are collimating assemblies the construction of which will be clear from FIGURES 4, 5 and 6.

Each of these assemblies comprises an aluminum tube 78 closed at its inner end as indicated at 80 and forming part of an assembly providing a flange 82 by means of which the tube is secured in fixed position by clamps 84 secured by screws threaded into the cylinder 10. At its outer end the tube assembly is provided with a semispherical wall arrangement 86 associated with a socket assembly 88 secured by a closure member 90 within a housing member 92. The housing member 92 is thus mounted for angular adjustment about the center of the spherical mounting 86 and is held in adjusted position by a threaded plug 94. The housing 92 is provided with an interior chamber communicating with the interior of the tube 78 and is closed by a plane member 96 formed of aluminum.

Within the housing 92 there is mounted a carriage 100 which supports a collimating tube 102 of stainless steel or the like which is closed at its left-hand end by an aluminum plug as viewed in FIGURE 4 and closed at its right-hand end by an aluminum plug against the plate 96 against which there also slides the carrier 100. The carrier 100 is provided with a pair of tracks 104 and 106 located at right angles to each other which receive slide blocks 108 and 110, respectively, which are formed as nuts through which are threaded screws 112 and 114 journalled in the housing walls and provided externally with knobs 116 and 118 by means of which they may be rotated, the stems of the screws passing through suitable stuffing boxes. Threaded openings 120 and 122 provide for the introduction of mercury and its withdrawal, these openings being normally plugged with the apparatus filled with mercury which fills, in particular, the interior of the tube 78 and the chamber within the housing 92 exteriorly of the tube 102 which is provided with a bore of small diameter and which contains air, the mercury being kept out of the interior of this tube by reason of the aluminum plugs. As will be evident this construction provides a passage of very small cross-section for the passage of gamma rays from the corresponding source, the gamma rays which are not aligned with the opening in the tube 102 being obstructed by the mercury.

Exteriorly of the plate 96 there is another housing member 98 providing a chamber into which there projects a screw 124 journalled in the member 98 and arranged to be turned from the outside of the housing. A nut member 126 is threaded on the screw 124 and carries a wedge 128 desirably of tungsten which may be moved across the opening of the tube 102 so as to interpose more or less absorption material in the path of the gamma rays passing through the tube 102, thus affording a control of the intensity of the rays which pass toward the right as indicated in FIGURE 4 and enter a detector, generally indicated at 129 which may be of the type described in my prior application, comprising a scintillation crystal in association with a multiplier photo tube. The circuit associated with the phototube may be of the type described in my prior application and is not detailed herein.

Figure 3:
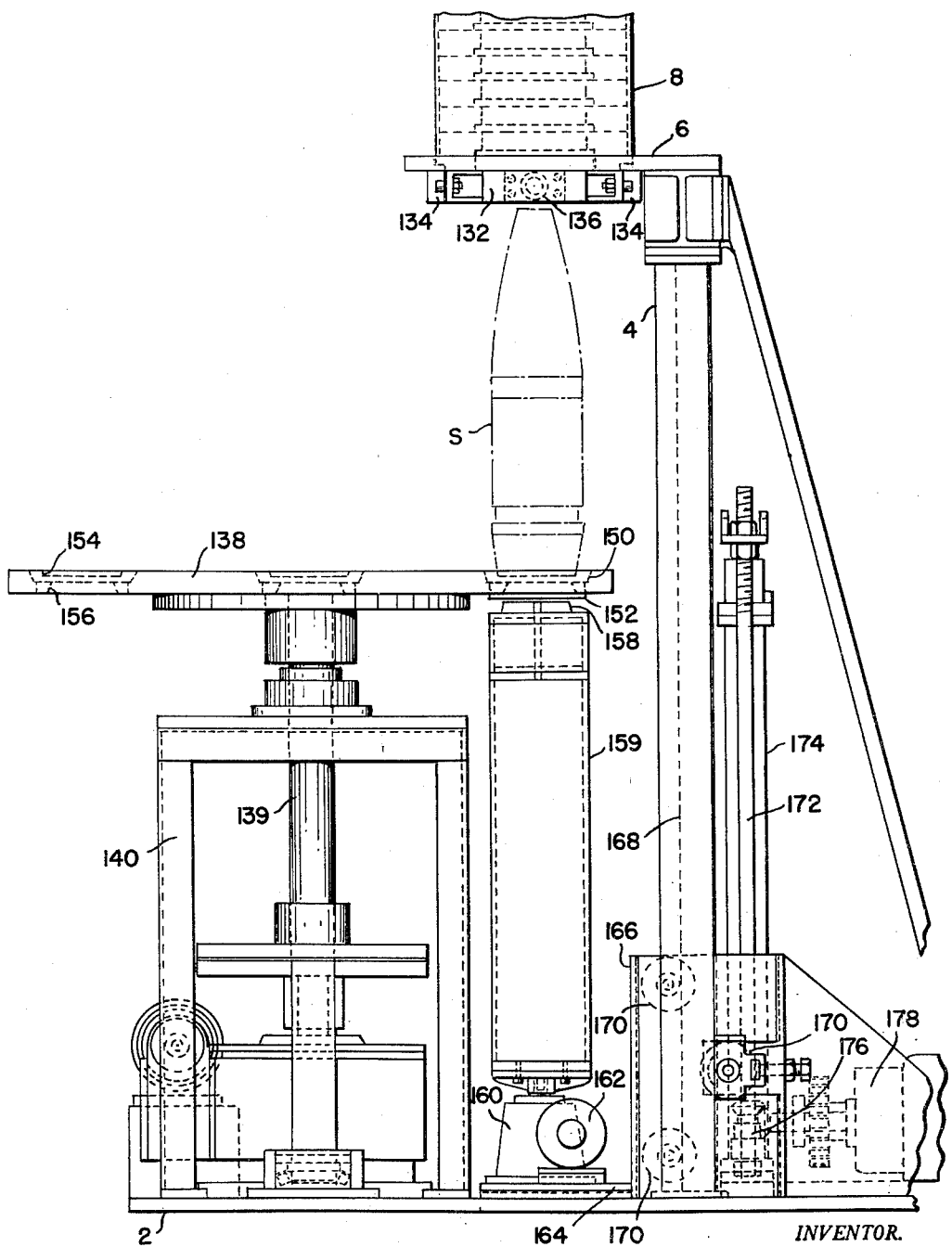
FIGURE 3 is an elevation showing the elements involved in FIGURE 2.

Referring now to FIGURE 3, the opening in the housing 8 is arranged to be closed off when the apparatus is not in use by means of a sealing slide 132 in the form of a lead plate mounted to slide in tracks 134 and operated by means of a hydraulic cylinder 136. This slide is closed whenever the source or sources are in the housing 8 and the operation is not being conducted.

A rotary table 138 is mounted on a shaft 139 supported in a frame 140 and is arranged to be intermittently driven by a motor 142 through a drive mechanism including a Geneva arrangement 144. The table 138 has four stationary positions in which it is accurately aligned by the engagement of sockets in members 146 carried thereby by the tooth of a plunger 148 which is desirably electromagnetically operated. Any slight error in positioning of the table 138 through the Geneva mechanism is rectified by the locking engagement just mentioned to bring the table accurately in position with the centers of openings 150 therein in alignment vertically with the central axis of the housing 8.

Each of the openings 150 is arranged to receive a member 152 provided in its upper surface with a socket 154 for the reception of the base end of a shell S and on its under surface with a socket 156 arranged to be entered by the tapered nose portion 158 of a rotary tubular member 159 which is mounted for rotation by a motor 162 through reduction gearing in a base support 160 carried by a platform 164 of a carriage 166. The carriage 166 is mounted for vertical movement on tracks 168 by means of rollers 170. Rapid rising and lowering movements are imparted to the carriage 166 by means of the hydraulic cylinder 174 acting through depending rods 172, the lower ends of which are threaded and engaged by nuts 176 rotatably mounted in the carriage and arranged to be driven through gearing by a motor 178 also mounted on the carriage. The rotation of the nuts effects slow vertical movements of the carriage relative to the rods 172 which, during a scanning operation, are located in fixed vertical position.

The operation of the device is as follows:

Sources 50 are located within the tube 46 in desired positions and the slides 68 adjusted to correspond thereto so as to give at any time an approximate indication of the vertical positions of the sources. As indicated by the break at the upper portion of FIGURE 1, the storage housing may be of any desired length to receive the tube 46 when it is withdrawn from action, its lower end being then brought above the lower end of the plate 26. When the apparatus is not in use the storage chamber is rotated so as to provide complete closure thereof against the emission of gamma rays.

When scanning is to be effected, a shell, or other object, may be placed in position in a member 152 in the table 138, the position of placement being remote from the chamber 8. Then by rotation of the table the shell may be brought below the chamber 8, whereupon the carriage 166 is raised by the action of the hydraulic cylinder 174 to cause the member 159 to seat in, and raise out of the table the member 152 which carries the shell in its upper socket. The shell is then projected into the chamber 8 in predetermined position, embracing the sources 50 which previously have been projected downwardly into the chamber 8 by the action of the motor 60 and have been located in alignment with the collimating and detecting devices. Scanning is then accomplished by the rotation of the member 159 together with rotation of the nut arrangements 176 to give slow vertical movement to the carriage 166 and shell. Scanning is thus accomplished along a spiral path. Following the completion of the operation the shell which has been examined is lowered so that its member 152 is again received by the table, whereupon the table is rotated to bring another shell in position for repetition of the cycle described. The shell which has been examined is simultaneously moved to an unloading position where it may be safely handled.

Alignment of the collimating tube 102 with the source with which it is associated is effected by manipulation of the devices illustrated in FIGURES 4 and 5. With the detector in position an operator may determine proper alignment by noting maximum intensity of the gamma rays, the tube 102 being tilted and traversed laterally both vertically and horizontally to secure proper indication of alignment. The slide 68 served to indicate the vertical positions of the sources, helping to facilitate the adjustment. Finally, in the preliminary adjustments, the wedge 128 is so located so as to secure the desired intensity of radiation detection. The adjustment of the wedge serves to secure the proper magnitude of radiation to correspond to different thicknesses of the object undergoing examination.

It will be evident that the apparatus described provides for the rapid examination of objects and it will be apparent that variations may be made in details without departing from the invention as defined in the following claims.

What is claimed is:

1. Apparatus for the examination of articles comprising a shielded enclosure having an aperture therein, means positioning a hollow article within said enclosure, said means imparting rotational and axial movements to said article, a radioactive source, means positioning said source within said article, a detector of radiation outside said enclosure and aligned with said aperture and source, and means for collimating rays passing through said aperture to the detector.

2. Apparatus for the examination of articles comprising a shielded enclosure having an aperture therein, means positioning a hollow article within said enclosure, said means imparting rotational and axial movements to said article, a radioactive source, means positioning said source within said article, a detector of radiation outside said enclosure and aligned with said aperture and source, and means for collimating rays passing through said aperture to the detector comprising a tube and means for adjusting the directional alignment of said tube.

3. Apparatus for the examination of articles comprising a shielded enclosure having an aperture therein, means positioning a hollow article within said enclosure, said means imparting rotational and axial movements to said article, a radioactive source, means positioning said source within said article, a detector of radiation outside said enclosure and aligned with said aperture and source, a tube for collimating the rays passing through said aperture to the detector, a pool of liquid material impenetrable by radiation surrounding said tube, and means for adjusting the directional alignment of said tube within the liquid pool.

4. Apparatus for the examination of articles comprising a shielded enclosure having an aperture and an access opening therein, a carrier adapted to successively deliver tubular articles into alignment with said opening, means for lifting an article thus delivered from the carrier and moving the article in a spiral path about its axis within said enclosure, means for positioning a radioactive source within the article and in alignment with said aperture, and a detector of radiation outside said enclosure and aligned with said aperture and source, said means for moving the article also being adapted to replace the article on the carrier after each examination.

5. A device for collimating rays from a radioactive source comprising a tube, a pool of liquid material about said tube, said liquid material being impenetrable by said rays, and means for adjusting the directional alignment of the tube within said liquid pool.

6. A device for collimating rays from a radioactive source comprising a tube, a pool of liquid material about said tube, said liquid material being impenetrable by said rays, and means for adjusting the angular disposition of said tube with respect to said source.

7. A device for collimating rays from a radioactive source comprising a tube, a pool of liquid material about said tube, said liquid material being impenetrable by said rays, and means for effecting lateral and tilting adjustments of the tube within said liquid pool.

8. A device for collimating rays from a radioactive source comprising a tube, a pool of mercury surrounding said tube, and means for adjusting the directional alignment of the tube within said pool of mercury.

9. Apparatus for the examination of articles comprising a source of radioactive material, a detector of radiation, a shield between said source and detector and having an aperture aligned therewith, and a collimating device within said aperture, said device comprising a tube, a pool of mercury surrounding the tube, means for effecting lateral rectangular adjustment and tilting adjustment of the tube.

10. Apparatus for the examination of articles comprising a radioactive source, a detector of radiation, a shield between said source and detector and having an aperture aligned therewith, and a device for collimating the rays from said source, said device comprising: a member disposed in said opening, a pool of liquid material surrounding said member and filling the remaining space in said aperture, said liquid being impenetrable by said rays, said member having a bore extending therethrough in general alignment with said source and detector, and means for adjusting the position of said member within said liquid pool and thereby adjusting the directional alignment of said bore.

References Cited in the file of this patent

UNITED STATES PATENTS

| | | |
|---|---|---|
| 2,338,868 | Owens | Jan. 11, 1944 |
| 2,349,429 | Herzog | May 23, 1944 |
| 2,435,134 | Forssell | Jan. 27, 1948 |
| 2,528,724 | Herzog | Nov. 7, 1950 |
| 2,649,549 | Green | Aug. 18, 1953 |
| 2,687,477 | Pfaff | Aug. 24, 1954 |
| 2,702,864 | McKee | Feb. 22, 1955 |
| 2,723,351 | Garrison | Nov. 8, 1955 |
| 2,885,557 | Kizaur | May 5, 1959 |
| 2,890,347 | McCormick | June 9, 1959 |